US010073814B2

(12) United States Patent
Devlin

(10) Patent No.: US 10,073,814 B2
(45) Date of Patent: *Sep. 11, 2018

(54) METHOD FOR REPRESENTING AND SOLVING ALGEBRAIC EQUATIONS WITH A PHYSICAL OR VIRTUAL GEAR SYSTEM

(71) Applicant: Brainquake Inc., Petaluma, CA (US)

(72) Inventor: Keith James Devlin, Petaluma, CA (US)

(73) Assignee: BRAINQUAKE INC., Petaluma, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 14/833,037

(22) Filed: Aug. 21, 2015

(65) Prior Publication Data
US 2016/0055123 A1 Feb. 25, 2016

Related U.S. Application Data

(60) Provisional application No. 62/040,091, filed on Aug. 21, 2014.

(51) Int. Cl.
*G06F 17/11* (2006.01)
*G09B 23/02* (2006.01)

(52) U.S. Cl.
CPC ............. *G06F 17/11* (2013.01); *G09B 23/02* (2013.01)

(58) Field of Classification Search
CPC ........... G06F 17/11; G09B 23/02; G09B 5/02; G09B 7/00; G09B 7/04
See application file for complete search history.

(56) References Cited

U.S. PATENT DOCUMENTS

| | | | | |
|---|---|---|---|---|
| 4,218,609 A * | 8/1980 | Chin | ...................... | G09B 19/02 434/191 |
| 5,100,142 A * | 3/1992 | Cannata | ................ | A63F 9/0819 434/401 |
| 5,149,269 A * | 9/1992 | Ylitalo | ...................... | G06C 1/00 434/203 |
| 7,491,061 B2 * | 2/2009 | Mickey | .................. | G09B 19/02 434/191 |
| 2007/0166673 A1 * | 7/2007 | Frieman | .................. | G06C 1/00 434/203 |
| 2008/0268407 A1 * | 10/2008 | Brett | ....................... | G09B 19/02 434/195 |

* cited by examiner

*Primary Examiner* — Eddy Saint-Vil
(74) *Attorney, Agent, or Firm* — Lathrop Gage L.L.P.

(57) ABSTRACT

A method for representing and solving algebraic equations that allows a user to view and solve algebraic equation with a virtual gear system. The virtual gear system includes a virtual primary cog and virtual secondary cogs. The virtual primary cog represents a range of outcomes for the virtual gear system and contains a number of teeth that is quantitatively greater than a numerical constant of the algebraic equation; amongst the teeth is a target tooth that represents the numerical constant. Each virtual secondary cogs represent a term of the algebraic equation and includes a coefficient and a variable. Each of the virtual secondary cogs contains a number of teeth equal to the coefficient. The equation is solved by rotating the virtual secondary cogs until the target tooth is aligned with a fixed pointer where rotation of the virtual secondary cog represents a value input for the variable of a term.

12 Claims, 21 Drawing Sheets

METHOD FOR REPRESENTING AND SOLVING ALGEBRAIC EQUATIONS WITH A PHYSICAL OR VIRTUAL GEAR SYSTEM

The current application claims a priority to the U.S. Provisional Patent application Ser. No. 62/040,091 filed on Aug. 21, 2014.

FIELD OF THE INVENTION

The present invention relates generally to the field of mathematical problem solving. More specifically, the present invention provides a user with a method for representing and solving algebraic equations.

BACKGROUND OF THE INVENTION

Mathematics is a structured network of cognitive abstractions subject to precise laws, originally presented almost entirely in prose text and numerals. This approach was the norm until symbolic representation was invented around the $15^{th}$ Century. The introduction of the symbolic representation allowed people to understand and grasp the abstract nature of mathematics easier and quicker. Resultantly, symbolic representation grew in popularity in mathematics and the associated fields, eventually becoming the new norm and standard. Over the years, symbolic representation became ingrained in mathematic problems present in education, research, science, and engineering. In fact, symbol representation has been used for so long that people assume that mathematic problems can be presented and solved only with symbols and resultantly cannot discern the difference between the visual interface, i.e. symbols, and mathematics itself. While extremely beneficial for research and application purposes, symbolic representation does hinder many people in understanding and using mathematics. Numerous research studies going back to the early 1990s have shown that, when ordinary people are repeatedly presented with mathematical problems in a (non-symbolic) meaningful real-world or real-world-like environment, they rapidly achieve a high level of proficiency. This implies that the difficulties many people experience in doing mathematics are primarily of a linguistic nature, also known as the symbol barrier, and do not indicate a lack of mathematical thinking capacity.

Modern technology allow for new and novel means for representation of ideas and theories. The present invention is an alternative representation for mathematical equations which eliminates the traditional use of symbols in order to provide an alternative and user-friendly interface for mathematics. More specifically, the present invention is a method of using gears, which can be either physical or virtual, in order to visually represent and solve algebraic equations, thus overcoming the symbol barrier. This alternative approach to representing mathematical problems has significant potential, both for uses in mathematics and for educational purposes.

DETAIL DESCRIPTIONS OF THE INVENTION

All illustrations of the drawings are for the purpose of describing selected versions of the present invention and are not intended to limit the scope of the present invention.

The present invention is a method and a system that provides an alternative user-interface for mathematical problems, algebraic equations to be more precise. The present invention includes a method for representing the algebraic equation and a method for solving the algebraic equation. The method for representing the algebraic equation utilizes a gear system to express the algebraic equation in an alternative fashion when compared to traditional means. The method for solving defines the steps necessary to determine a set of variables that balances the algebraic equation using the aforementioned gear system, essentially identifying a solution to the algebraic equation.

Figure 2:
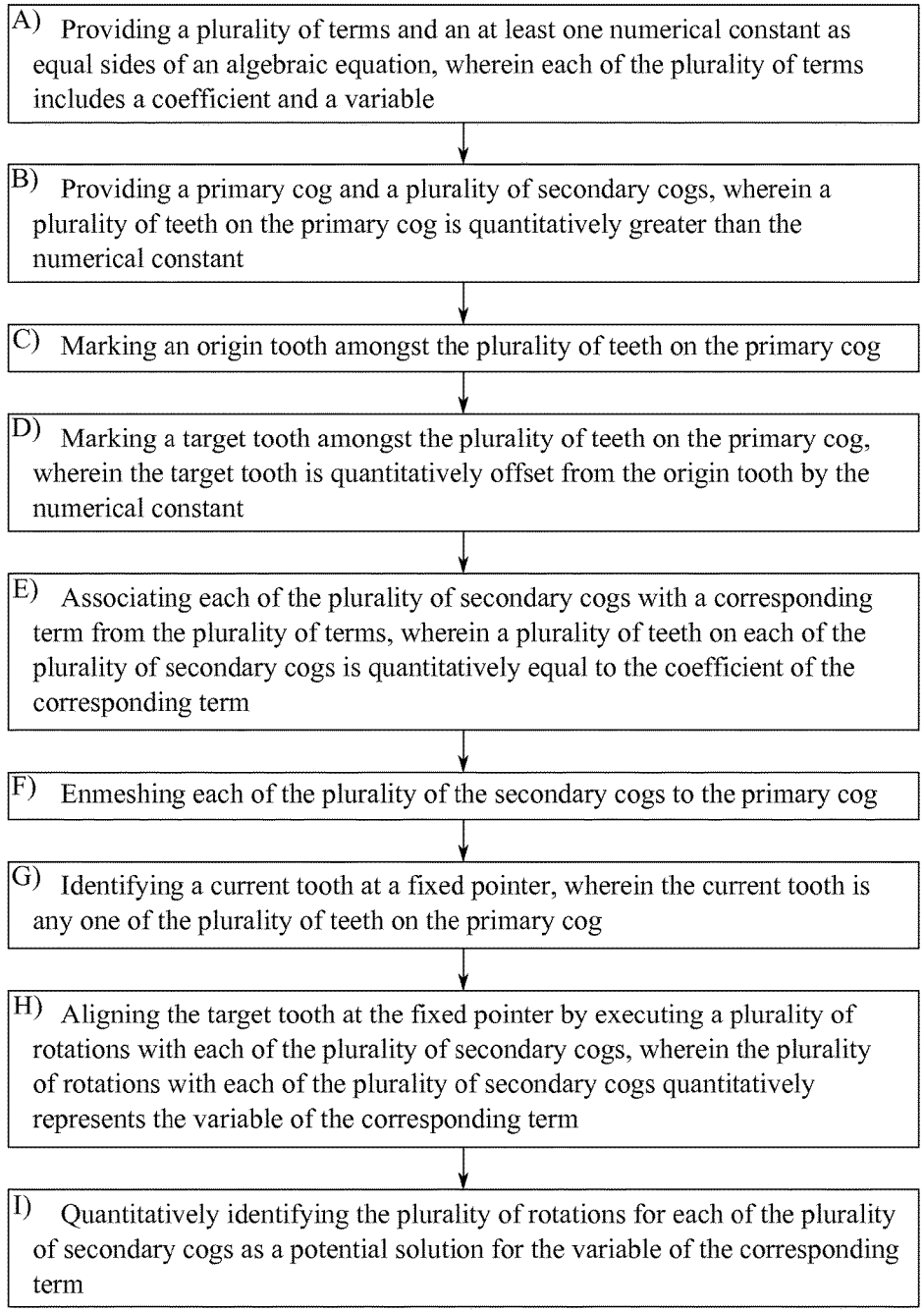
FIG. 2 is a flowchart illustrating the overall method executed by the physical gear system.

The gear system visually represents each entity of the algebraic equation and allows the user to manipulate said entities through the individual gears of the gear system in order to determine a solution to the algebraic equation. Entities of the algebraic equation include a plurality of terms and an at least one numerical constant, wherein one side of the equation is the plurality of terms and the other side of the algebraic equation is at least one numerical constant; each of the plurality of terms includes a coefficient and a variable (Step A), which is shown in FIG. 2. The variable is a symbol that represents an undefined value within the algebraic equation, while the coefficient is a constant number which multiples or amplifies the variable. Solving the algebraic equation includes identifying a value for each of the variables, which would balance the two sides of the algebraic equation. The present invention is best utilized for whole number arithmetic, but is applicable for alternative mathematic problems as well.

Figure 1:
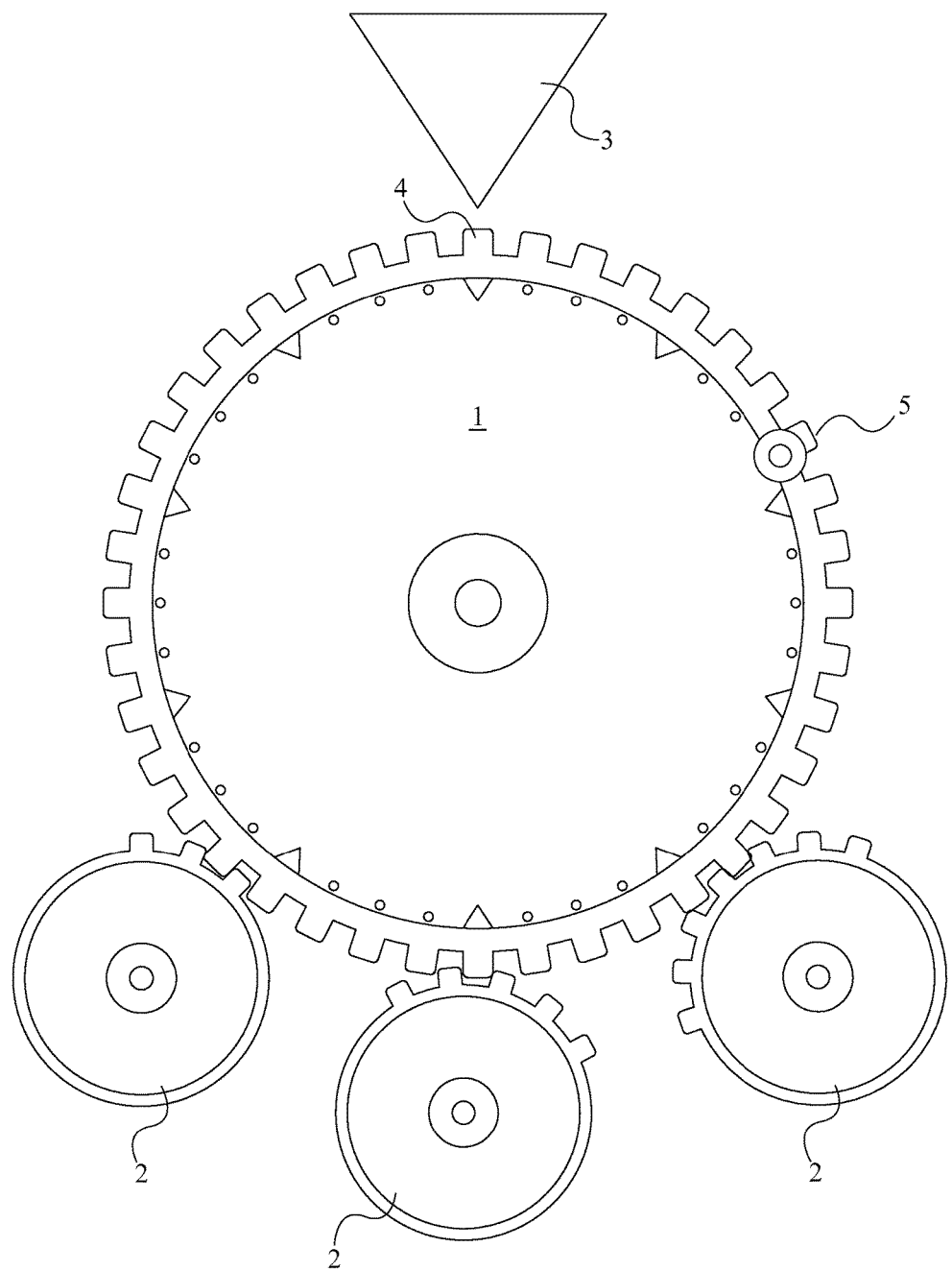
FIG. 1 is a schematic view of a physical or virtual gear system implemented in the present invention.

As can be seen in FIG. 1, the method of representation provides an alternative user-interface for the algebraic equation via the gear system. The gear system includes a primary cog 1, a plurality of secondary cogs 2, and a fixed pointer 3. The primary cog represents a range of solutions for the algebraic equation and includes a plurality of teeth that is quantitatively greater than the numerical constant (Step B). For example if the numerical constant is 20, than the number of teeth on the primary cog would need to be greater than 20. The plurality of teeth for the primary cog includes an origin tooth 4 and a target tooth 5, each marked accordingly. The origin tooth marks a starting point that the user may reference in order to identify the remaining teeth within the plurality of teeth, essentially representing the zero value (Step C). The target tooth represents the numerical constant of the algebraic equation. The target tooth is quantitatively offset from the origin tooth by the numerical constant (Step D), thus visually displaying the numerical constant as a radial increment on the primary cog. Additional teeth may be marked on the primary cog to indicate their respective offset quantity from the origin tooth. In one embodiment, each tooth on the primary cog is marked with a respective offset quantity from the origin tooth. Alternatively, every incremental tooth may be marked.

Figure 7:
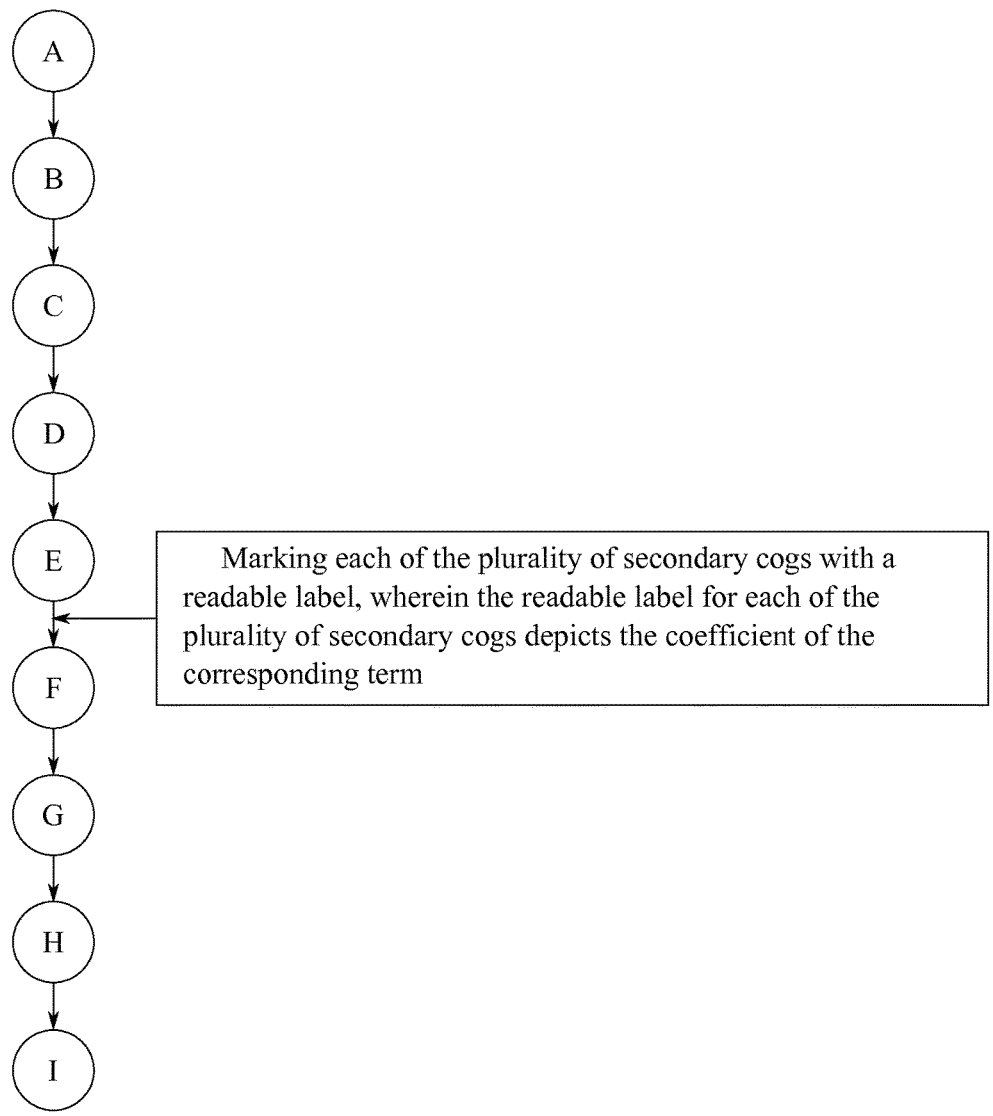
FIG. 7 is a flowchart illustrating a sub-step to mark each secondary cog for the physical gear system with a readable label.

The plurality of secondary cogs represents the side of the algebraic equation relating to the plurality of terms. Each of the plurality of secondary cogs is associated with a corresponding term from the plurality of terms. This relationship is conveyed to the user by quantitatively matching a plurality of teeth on each secondary cog to the value of the coefficient of its corresponding term (Step E). For example, if the corresponding term is "4x", then the secondary cog representing this particular term would have four teeth. Each of the secondary cogs is marked with a readable label that depicts the coefficient of the corresponding term, in turn conveying to the user with the number of teeth present on said secondary cog, which is outlined in FIG. 7. Each of the secondary cogs is designed to mesh with and engage the primary cog such that rotation of each of the plurality of secondary cogs is used to drive the rotation of the primary cog (Step F). This includes matching the size and type of the teeth used for each of the plurality of secondary cogs to that of the primary cog; a variety of types of teeth may be used for the primary cog and thus the secondary cogs.

The fixed pointer indicates the current output for the gear system, wherein the output corresponds to the side of the algebraic equation associated with the numerical constant. Additionally, the fixed pointer is used to zero/reset the gear system prior to solving the algebraic equation. The gear system is zeroed by positioning the origin tooth coincident with the fixed pointer. The fixed pointer is preferably shaped similar to an arrowhead and is positioned adjacent to the primary cog, oriented towards the center of the primary cog as seen in FIG. 1.

Figure 10:
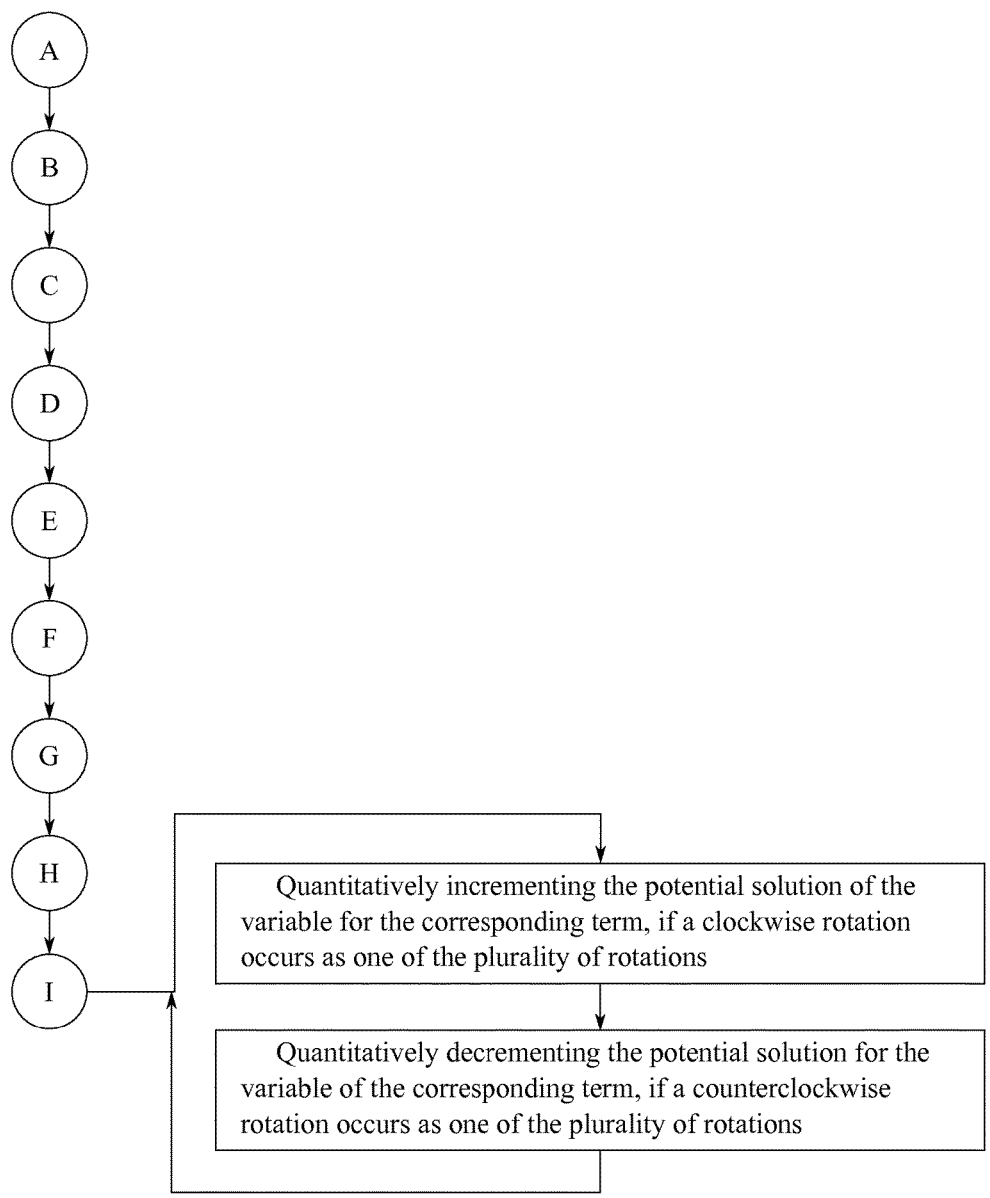
FIG. 10 is a flowchart illustrating sub-steps to increment or decrement potential solutions according to the rotational directions for each secondary cog for the physical gear system.
Figure 11:
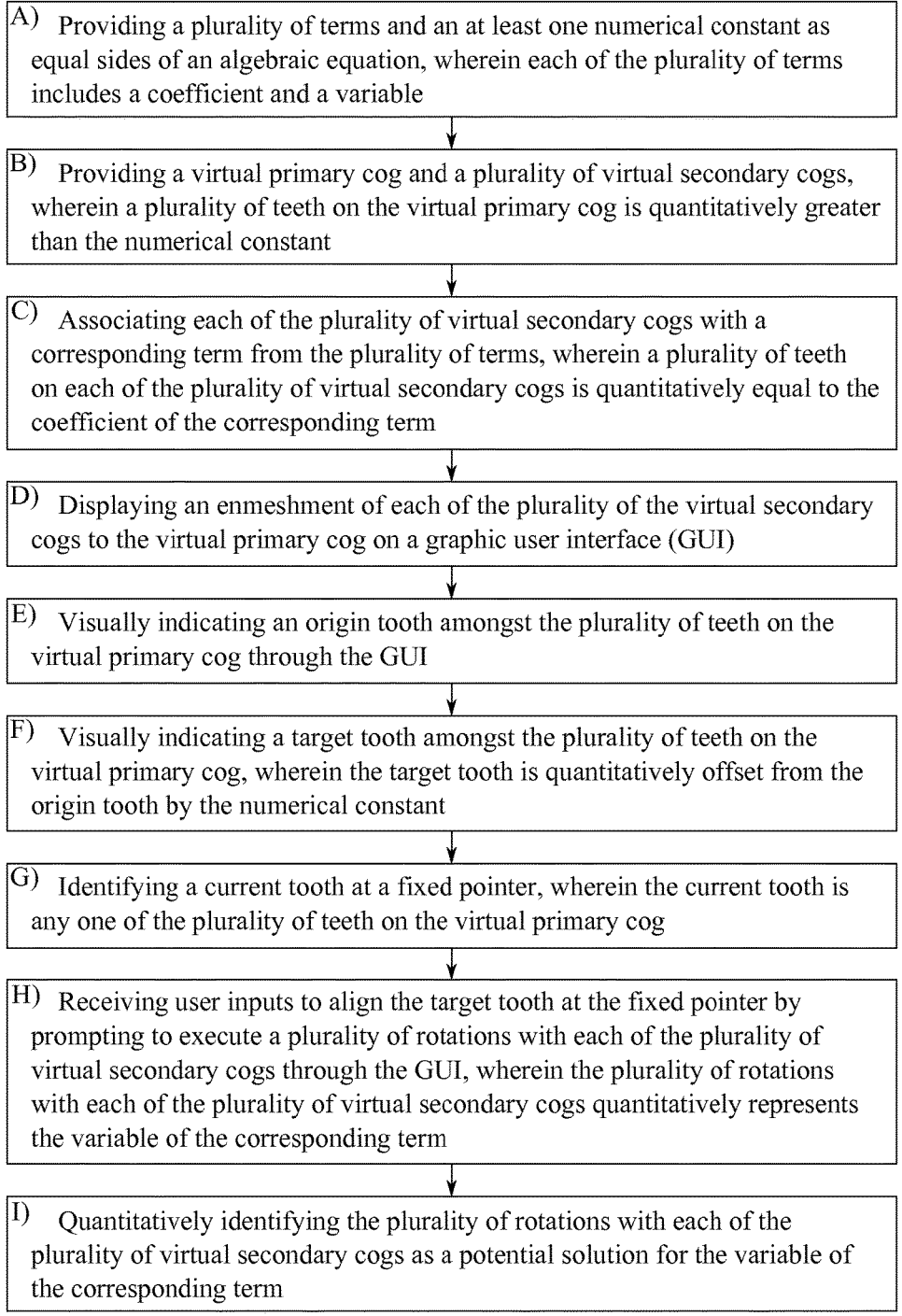
FIG. 11 is a flowchart illustrating the overall method executed by the virtual gear system.
Figure 12:
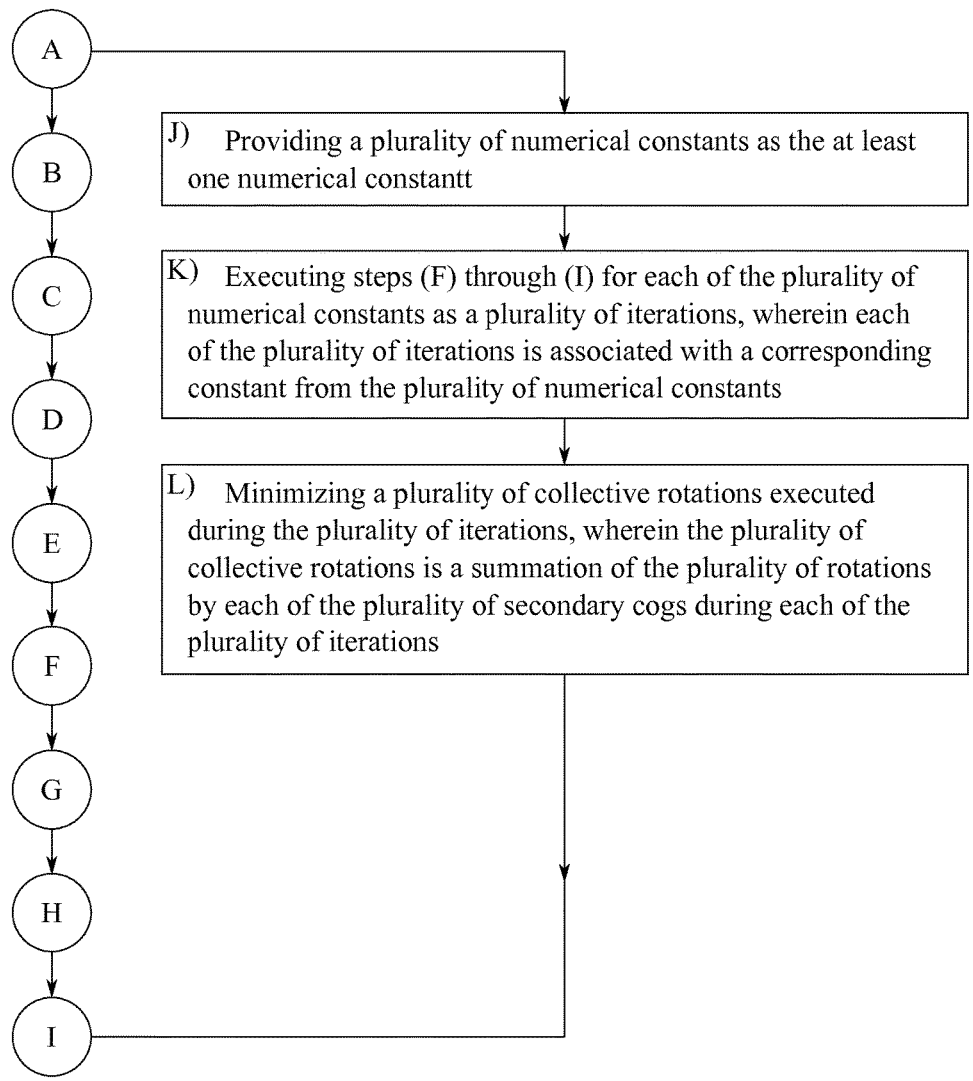
FIG. 12 is a flowchart illustrating the sub-steps of solving multiple algebraic equations with the virtual gear system through multiple iterations of the overall method.
Figure 13:
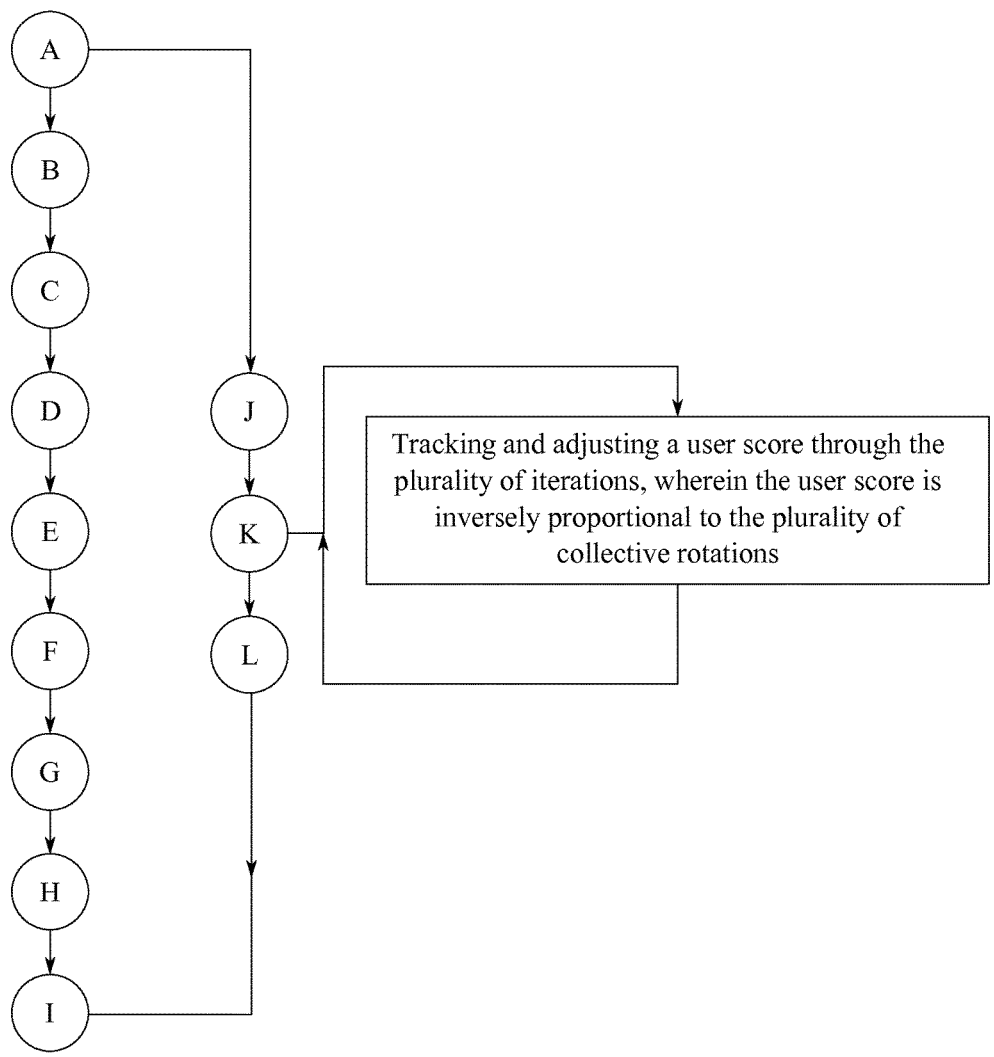
FIG. 13 is a flowchart illustrating sub-steps for tracking a user score as the virtual gear system is used in a game setting.
Figure 14:
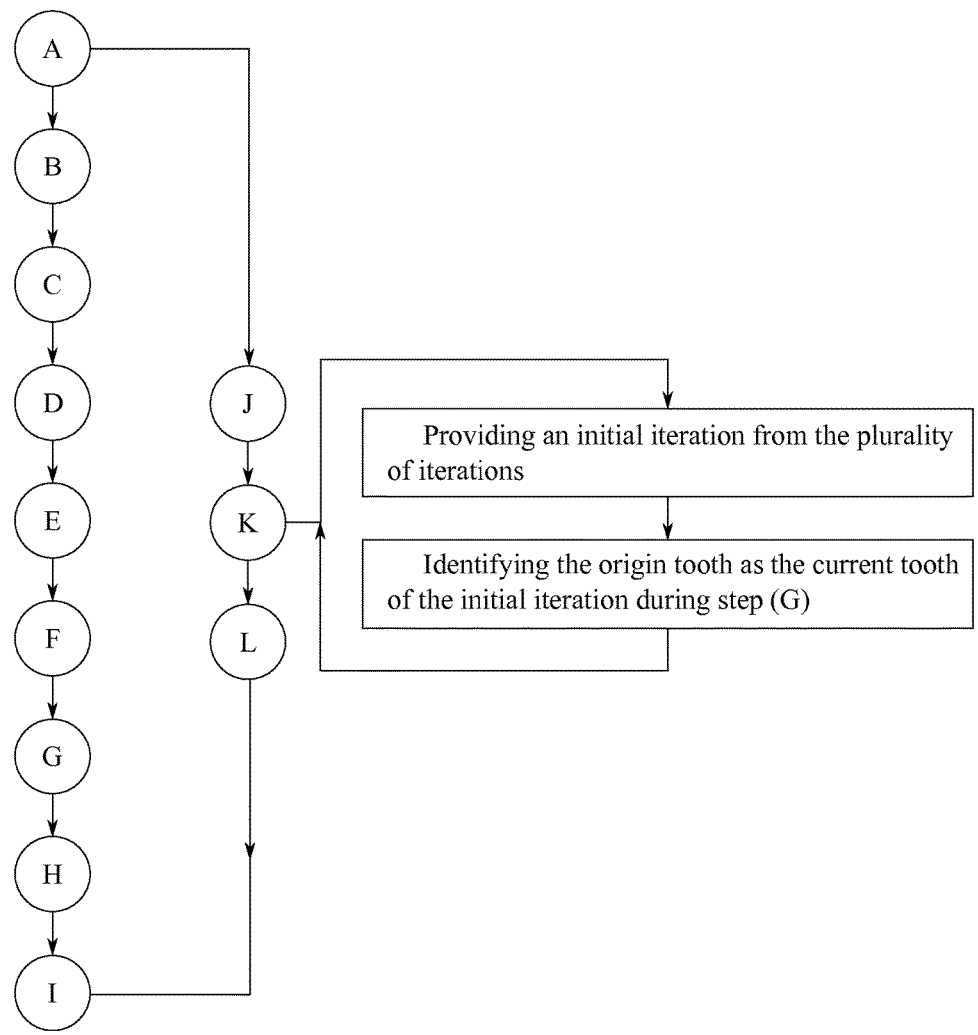
FIG. 14 is a flowchart illustrating sub-steps for executing the initial iteration of the overall method to solve multiple algebraic equations.
Figure 15:
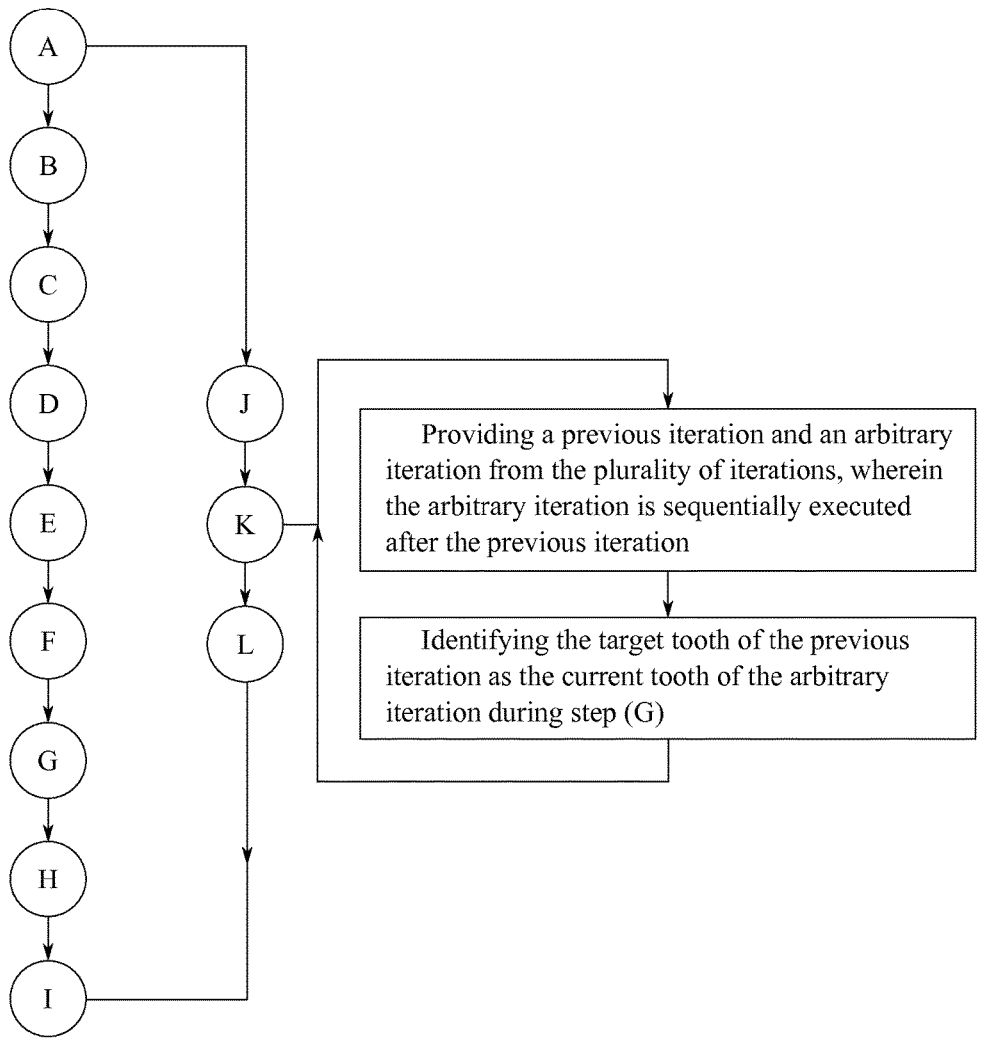
FIG. 15 is a flowchart illustrating sub-steps for executing the subsequent iterations of the overall method in order to solve multiple algebraic equations.
Figure 16:
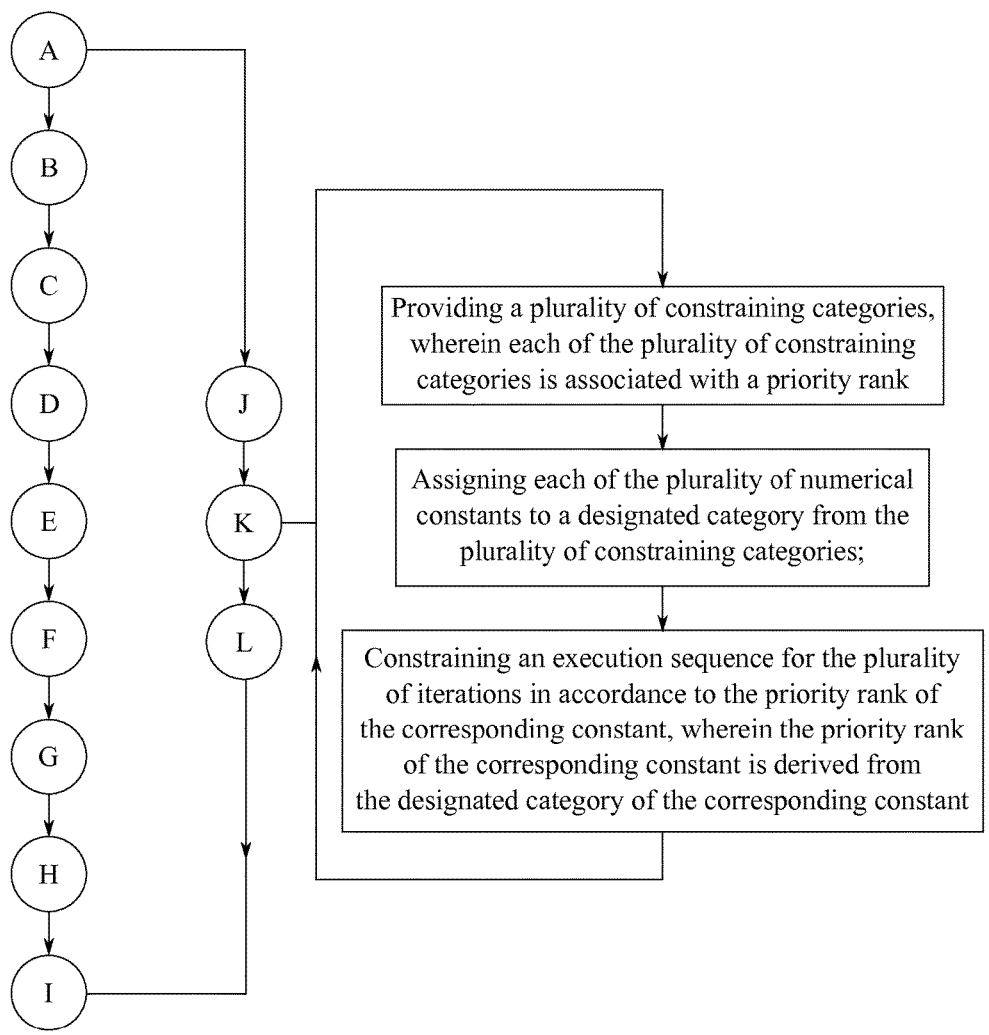
FIG. 16 is a flowchart illustrating sub-steps for constraining the overall method in order to solve multiple algebraic equations.
Figure 17:
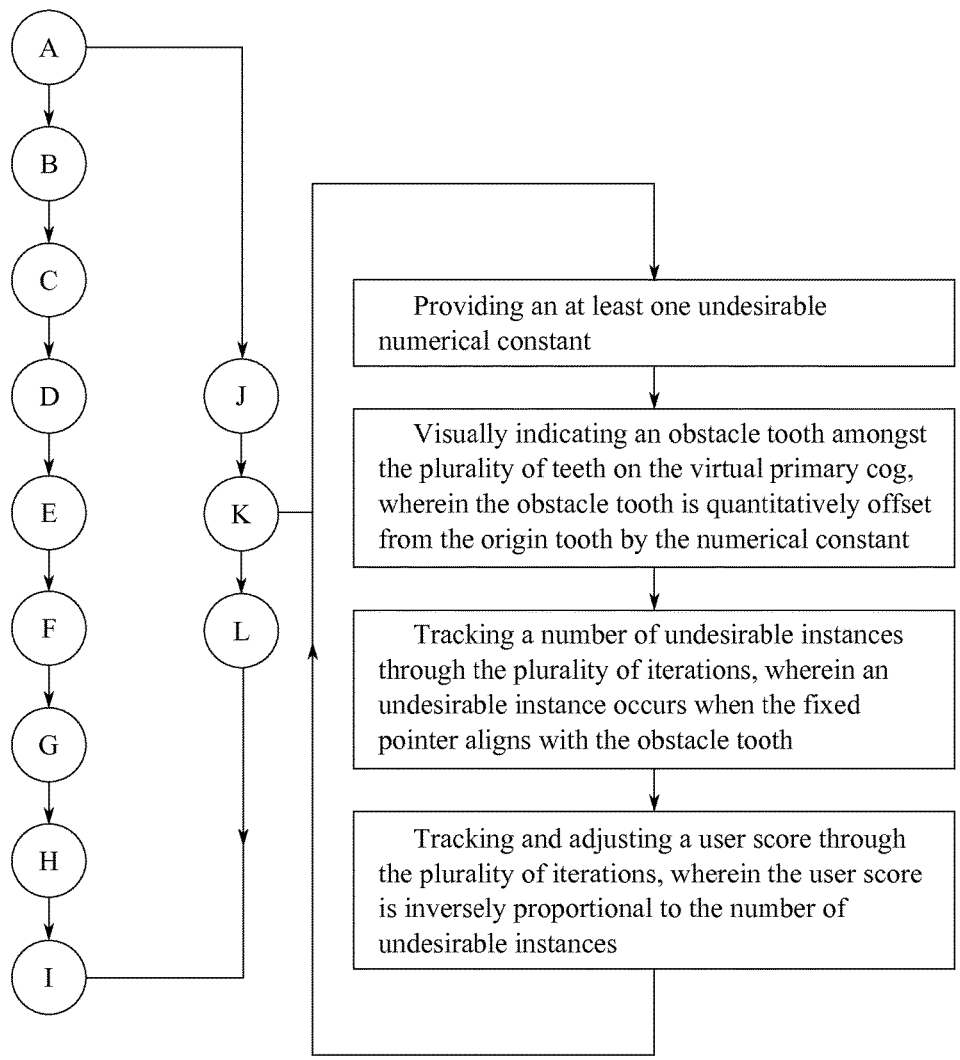
FIG. 17 is a flowchart illustrating sub-steps for presenting obstacles to a user in the game setting.
Figure 18:
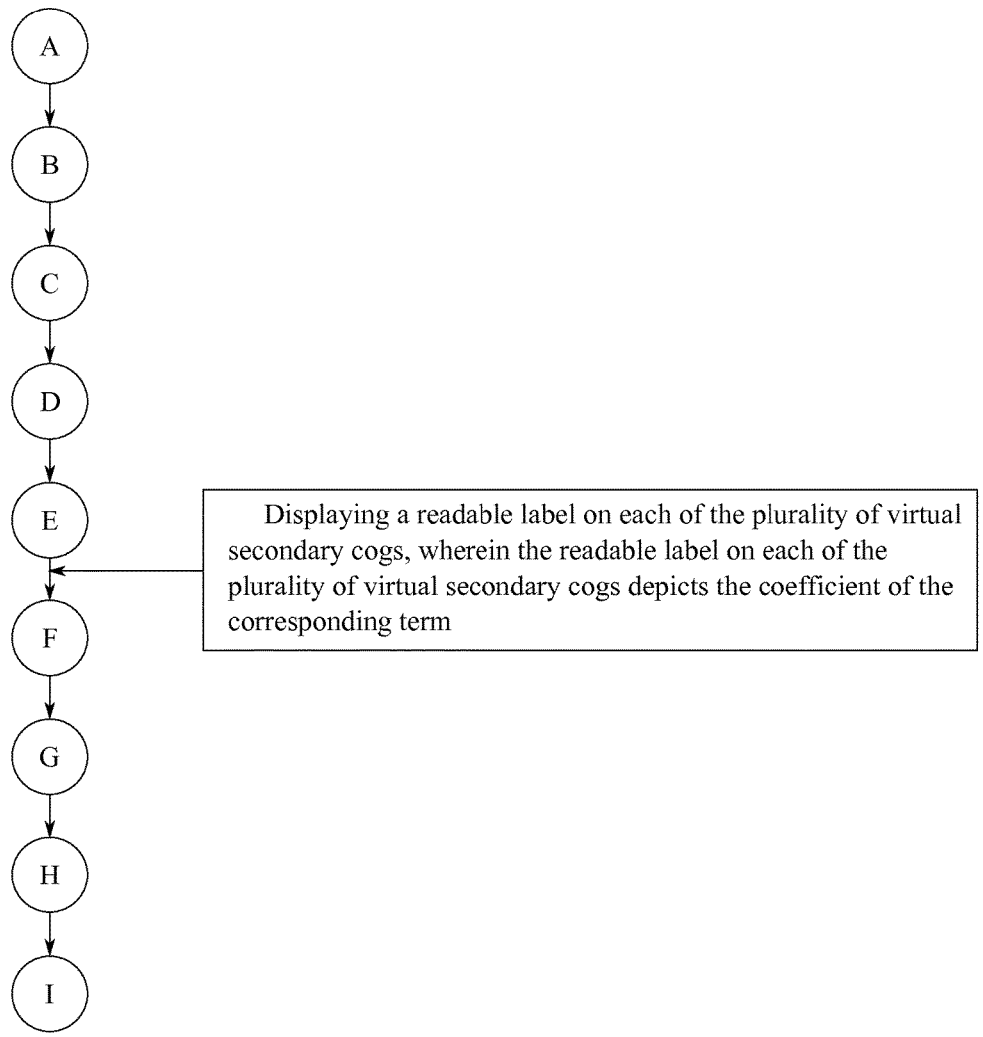
FIG. 18 is a flowchart illustrating a sub-step to display a readable label on each secondary cog for the virtual gear system.
Figure 19:
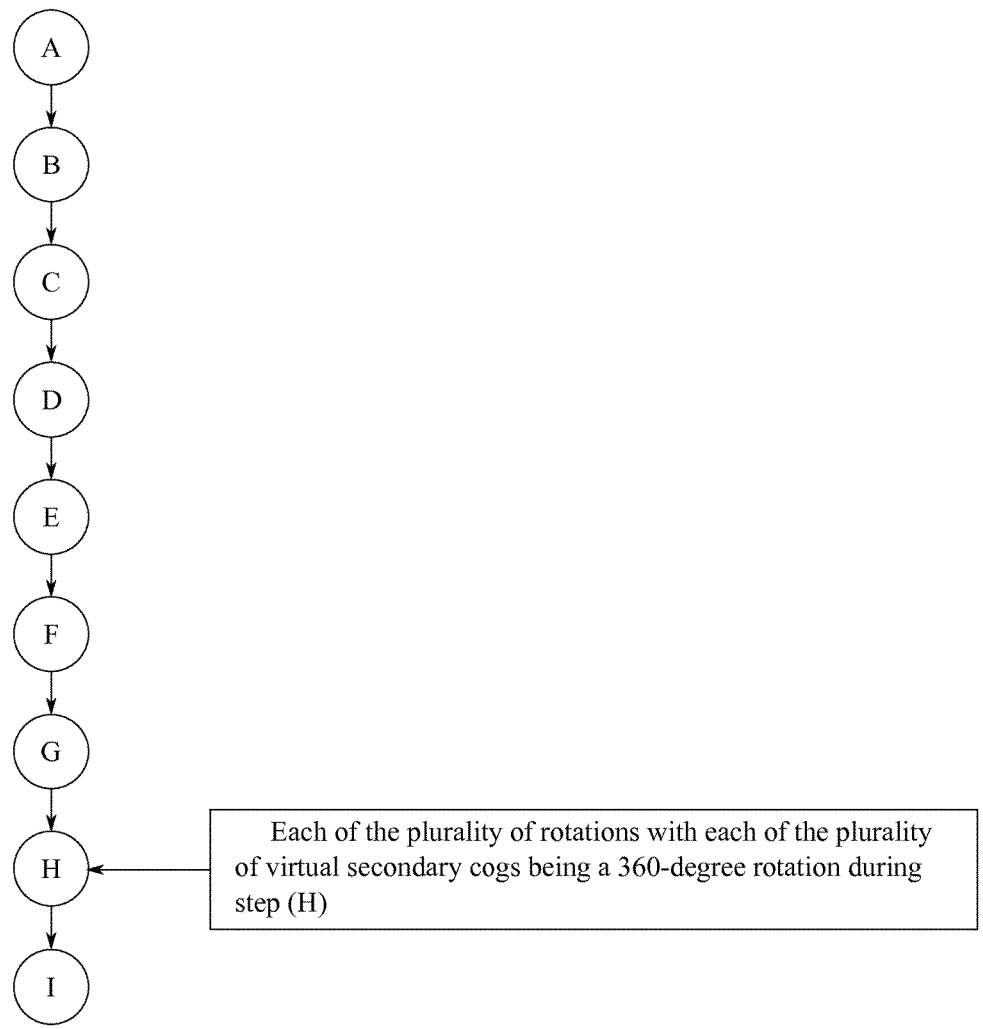
FIG. 19 is a flowchart illustrating a sub-step to rotate each secondary cog for the virtual gear system at 360 degree intervals.
Figure 20:
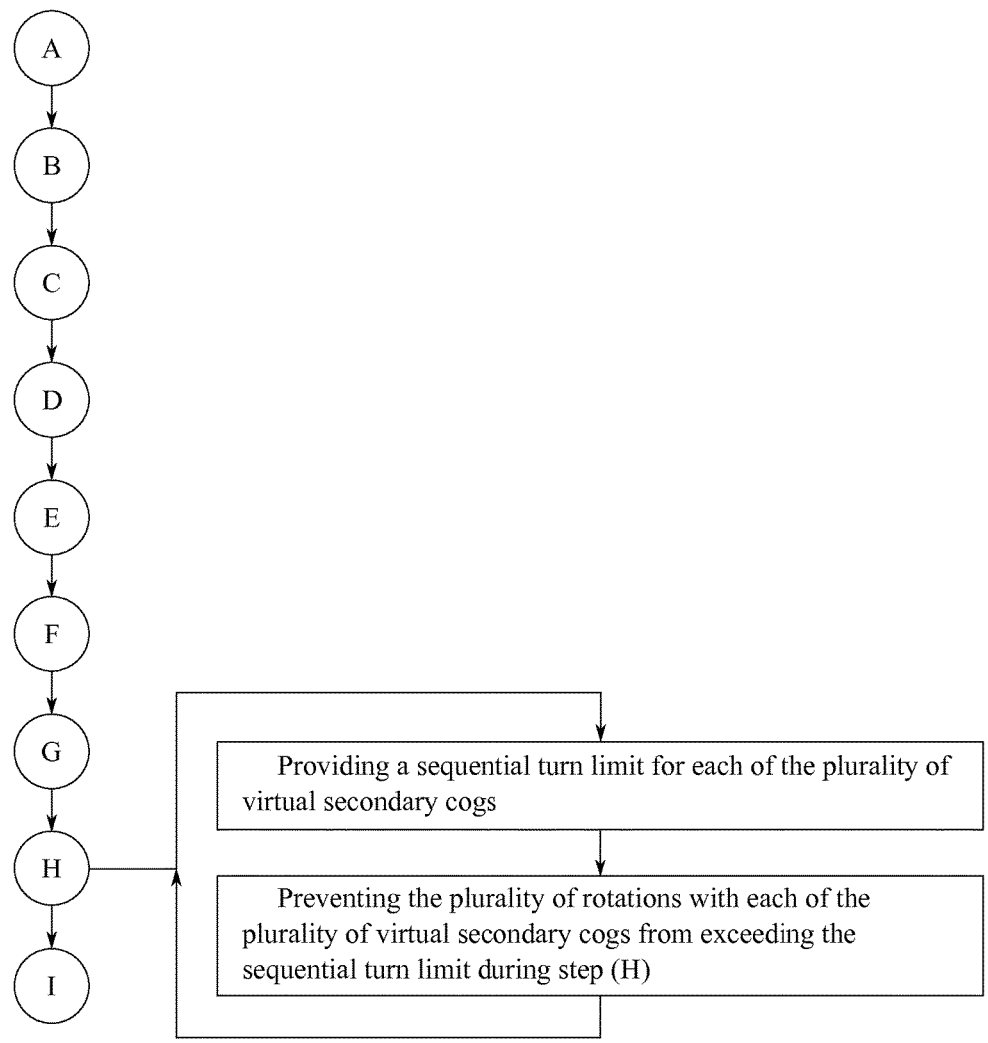
FIG. 20 is a flowchart illustrating sub-steps to rotate each secondary cog for the virtual gear system up to a certain number of times.
Figure 21:
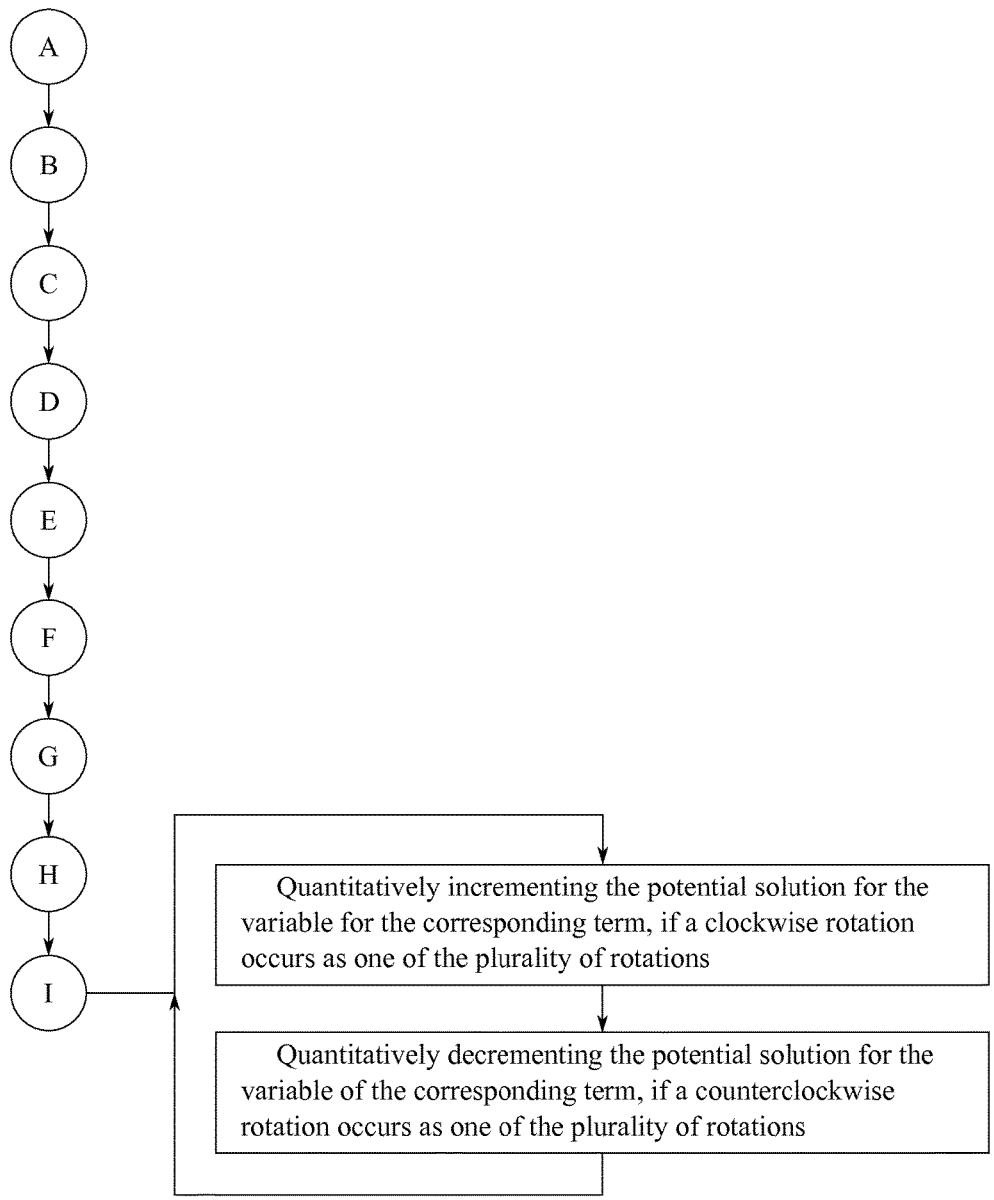
FIG. 21 is a flowchart illustrating sub-steps to increment or decrement potential solutions according to the rotational directions for each secondary cog for the virtual gear system.

In general, the method for solving the algebraic equation involves aligning the target tooth at the fixed pointer, thus setting the current output of the primary cog to be the numerical constant. This is accomplished by first identifying a current tooth at the fixed pointer, wherein the current tooth is any one of the plurality of teeth on the primary cog (Step G). If the current tooth is not the origin tooth while solving for the initial/only numerical solution, then the primary cog is rotated until the origin tooth is set at the fixed pointer, essentially calibrating or resetting the gear system. Once the gear system is reset, a plurality of rotations with each of the plurality of secondary cogs is then executed in order to rotate the primary cog so that the target tooth is aligned with the fixed pointer (Step H). This alignment between the target tooth and the fixed pointer yields a possible solution for the algebraic equation. The potential solution lies in the number of rotations executed for each of the secondary cogs. For example, two rotations of the secondary cog that is associated with the term "4x" translates to the variable "x" being two. Once the target tooth is aligned with the fixed pointer, then the plurality of rotations is quantitatively identified for each of the secondary cogs as a potential solution for the variable of the corresponding term (Step I). The rotation direction of each of the secondary cogs represents either an increase or decrease in value for the variable of the corresponding term. A clockwise rotation by the secondary cog represents a quantitative increment in the potential solution of the variable for the corresponding term, which is outlined in FIG. 10. Similarly, a counterclockwise rotation by the secondary cog represents a quantitative decrement in the potential solution of the variable for the corresponding term. For example, rotating one of the secondary cogs three turns clockwise and two turns counterclockwise means the value for the variable of the corresponding term is one.

Positioning the target tooth at the fixed pointer yields a solution for the algebraic equation, wherein the solution includes a potential solution for each of the variables, for each of the terms. However, this solution is only one of many possible solutions for the algebraic equation. The most optimal solution is achieved by minimizing the collective rotations of the secondary cogs. The least amount of rotations for each of the plurality of secondary cogs represents the most efficient and optimal solution for the algebraic equation.

Figure 3:
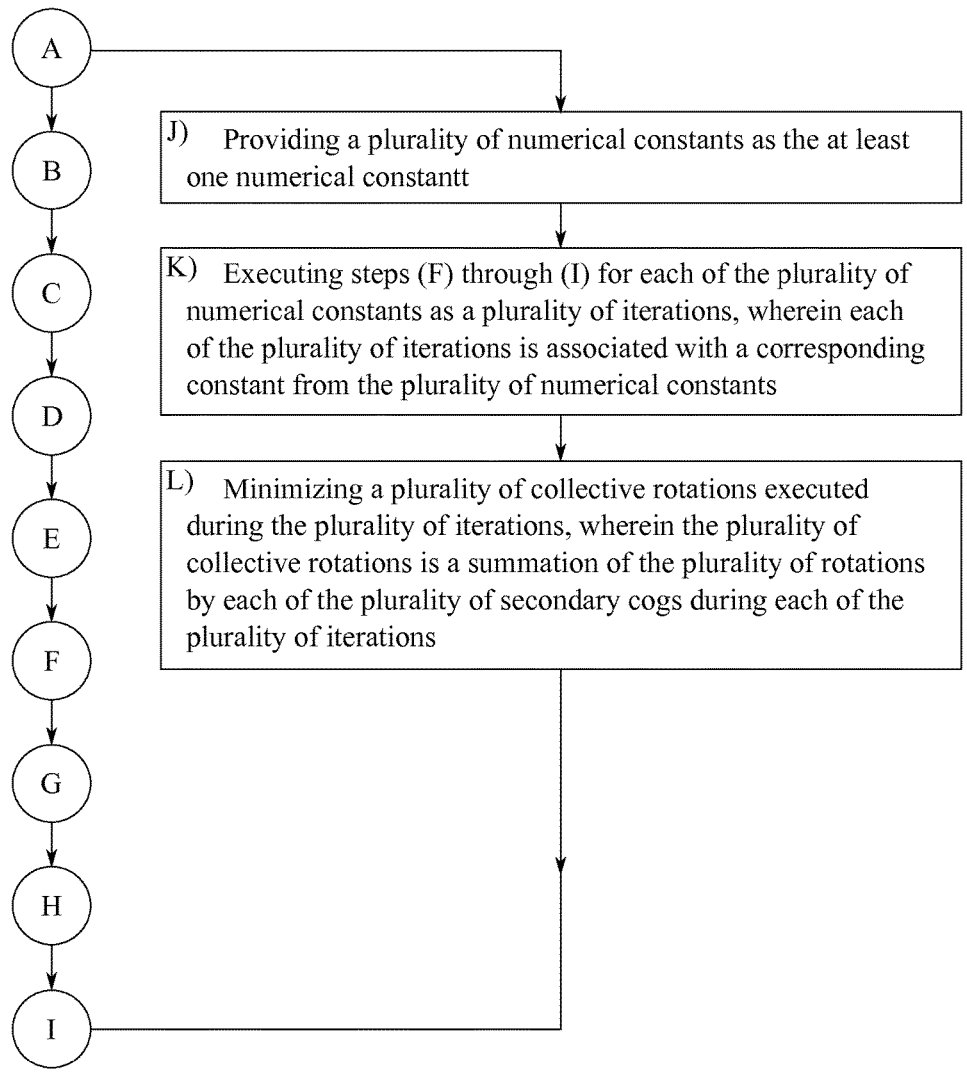
FIG. 3 is a flowchart illustrating the sub-steps of solving multiple algebraic equations with the physical gear system through multiple iterations of the overall method.
Figure 4:
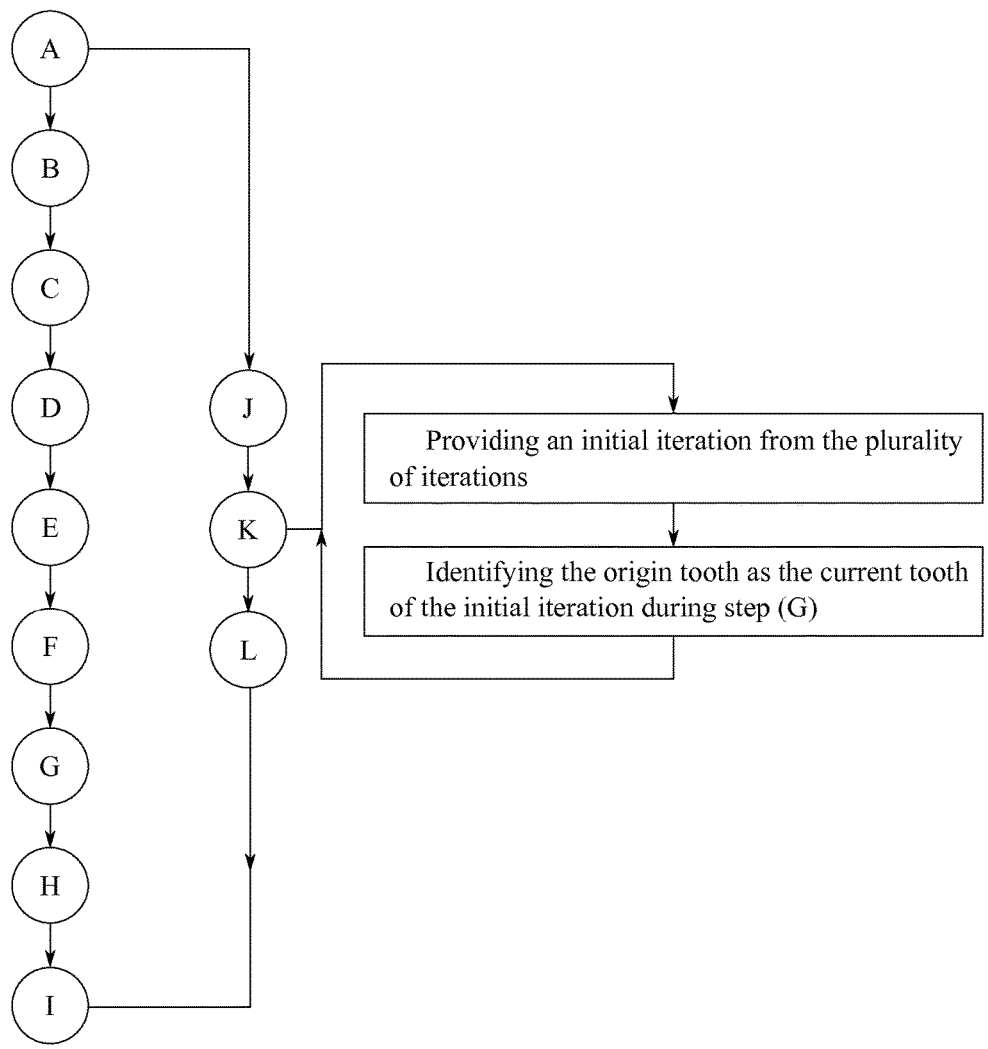
FIG. 4 is a flowchart illustrating sub-steps for executing the initial iteration of the overall method to solve multiple algebraic equations.
Figure 5:
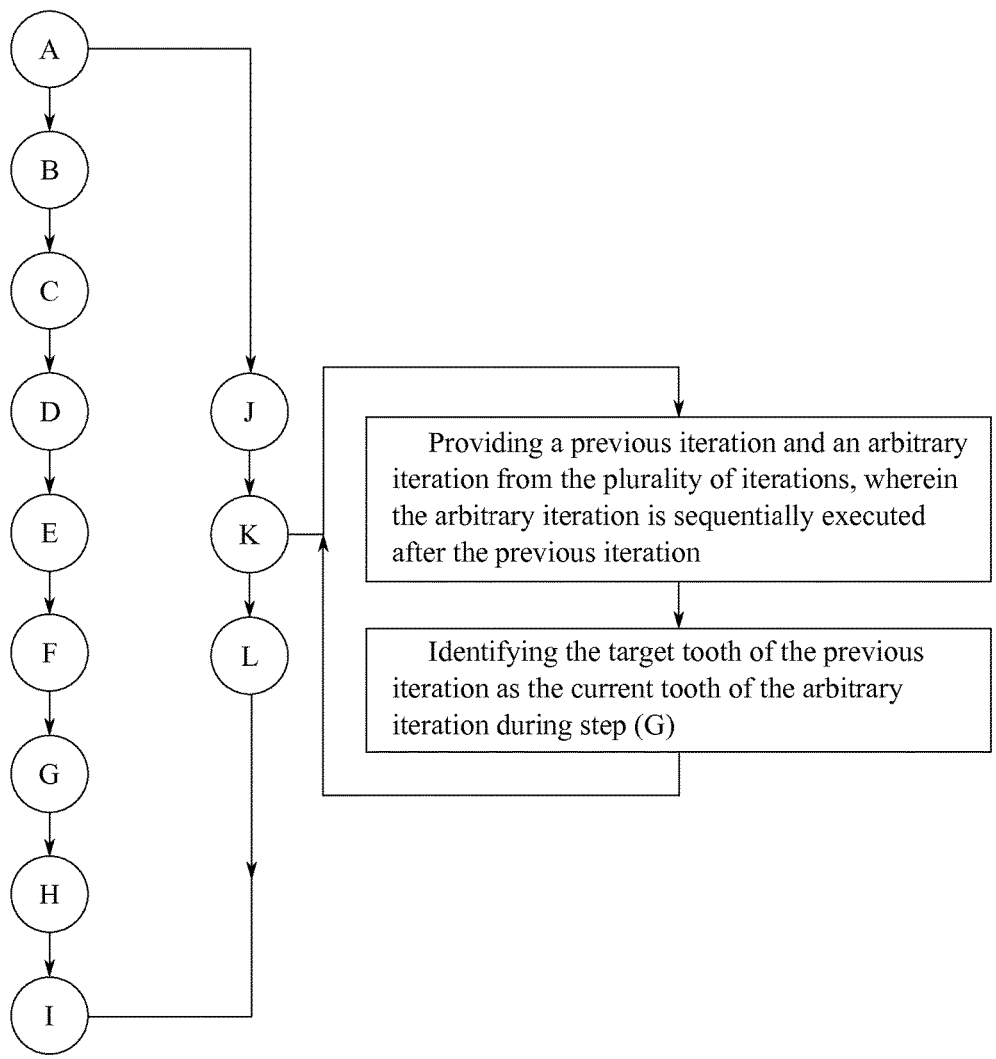
FIG. 5 is a flowchart illustrating sub-steps for executing the subsequent iterations of the overall method in order to solve multiple algebraic equations.

As can be seen in FIG. 3, the present invention may also be used to solve the algebraic equation for a plurality of numerical constants, which is also known as a system of equations. Solving for the numerical constants includes repeating the aforementioned method a multitude of times. More specifically, executing steps (F) through (I) for each of the numerical constants as a plurality of iterations. Each of the iterations is executed in order to solve the algebraic equation with a corresponding constant from the numerical constants as one side of the algebraic equation. Similar to solving for one numerical constant, an initial iteration from within the plurality of iterations includes identifying the origin tooth as the current tooth during step (G), beginning the plurality of iterations from the origin tooth, which is shown in FIG. 4. An arbitrary iteration from the plurality of iterations is defined as any iteration other than the initial iteration, while the previous iteration is defined as the iteration that is executed prior to the arbitrary iteration, which is shown in FIG. 5. Solving for the numerical constants requires identifying the target tooth of the previous iteration as the current tooth of the arbitrary iteration. Consequently, the primary cog is not zeroed before each iterations. For example, once the target tooth of each numerical constant has been aligned to the fixed pointer, then a solution is identified for the algebraic equation. An optimal solution is achieved when a plurality of collective rotations is minimized during the iterations. The plurality of collective rotations is defined as the summation of the rotations executed by each of the secondary cogs during each iteration.

Figure 6:
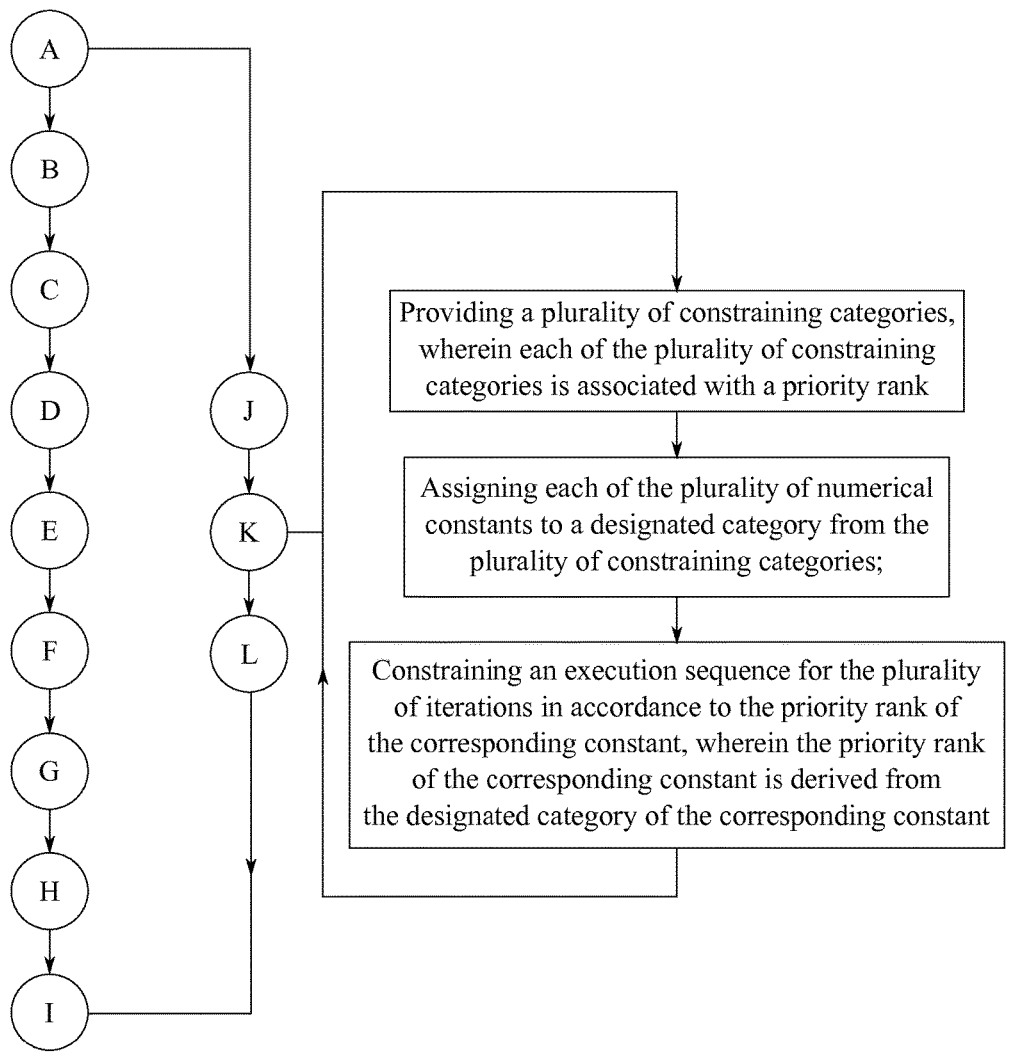
FIG. 6 is a flowchart illustrating sub-steps for constraining the overall method in order to solve multiple algebraic equations.

When solving the algebraic equation for more than one numerical constants (e.g. a system of equations), the present invention allows for constraints in the manner that a user solves for potential solutions, which is outlined in FIG. 6. The present invention provides a plurality of constraining categories, each of which is associated with a priority rank. The constraining categories are used to guide the steps taken by the user to solve the algebraic equation with the present invention. Each numerical constant is assigned to a designated category from the plurality of constraining categories. This allows the present invention to constraint an execution sequence for the plurality of iterations in accordance to the priority rank of the corresponding constant, and the priority rank is derived from the designated category of the corresponding constant. The execution sequence for the plurality of iterations provides the user with a guide to optimize the manner in which to solve for the potential solutions of the algebraic equation. Essentially, the execution sequence prompts the user to align the fixed pointer to one category of target teeth before aligning the fixed point to another category of target teeth. The plurality of constraint categories places restrictions on the manner on how the present invention can be used to solve the algebraic equation, similar to how a system of equations can be solved in multiple ways but is still mathematically constrained.

Figure 8:
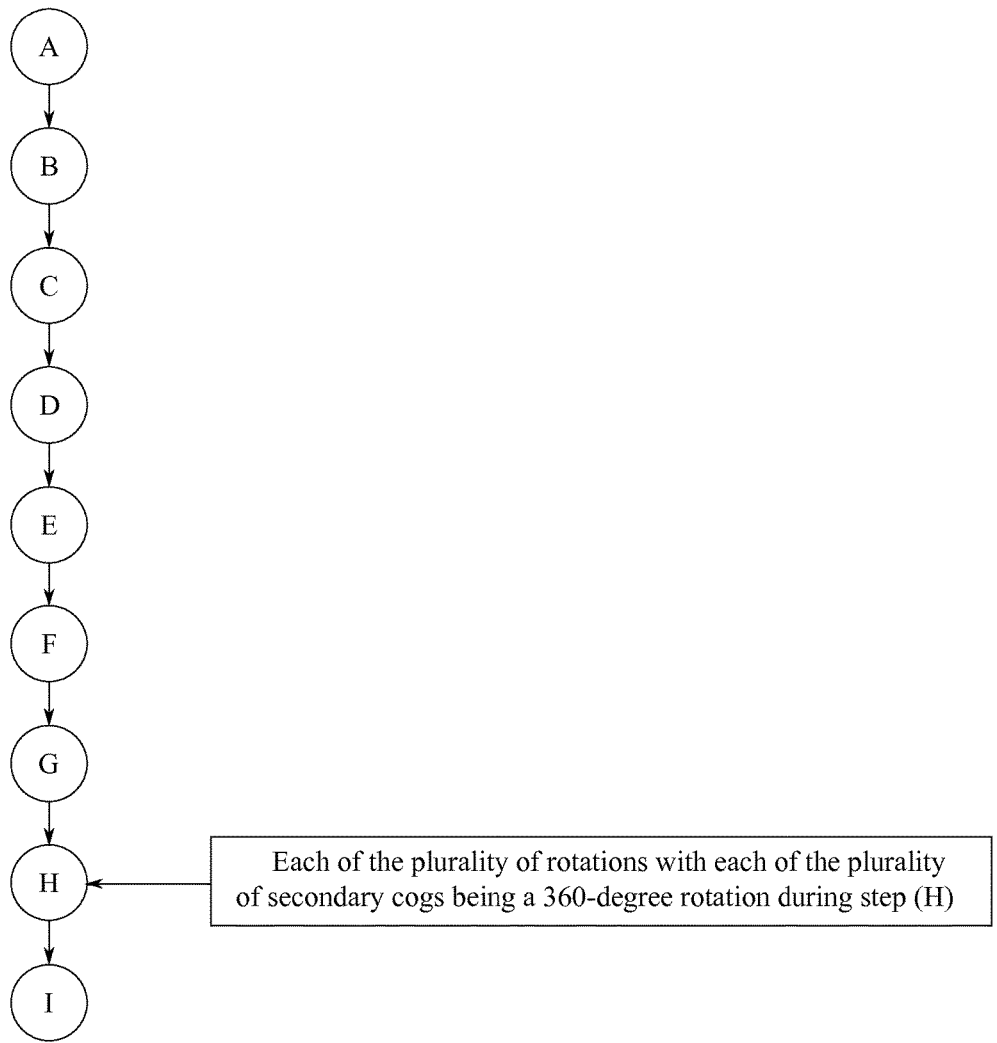
FIG. 8 is a flowchart illustrating a sub-step to rotate each secondary cog for the physical gear system at 360 degree intervals.
Figure 9:
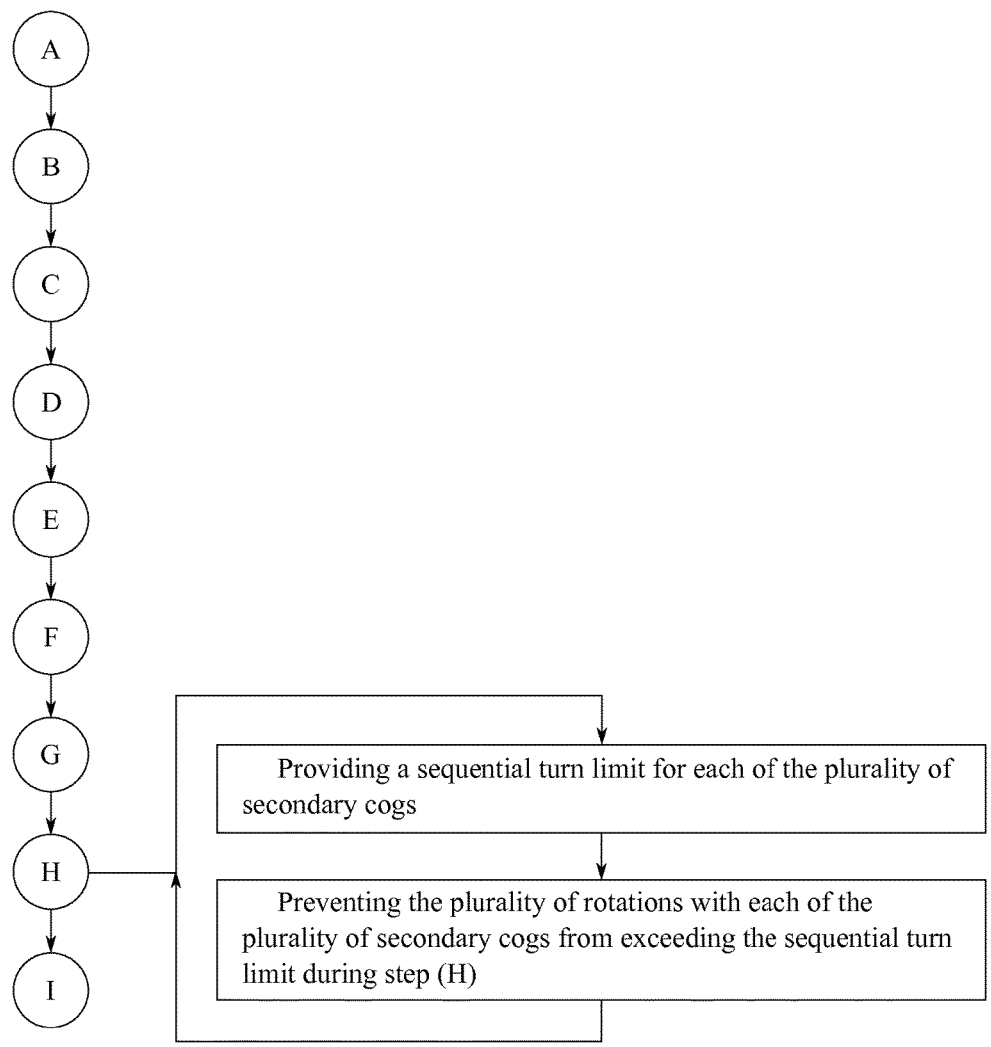
FIG. 9 is a flowchart illustrating sub-steps to rotate each secondary cog for the physical gear system up to a certain number of times.

In the preferred embodiment of the present invention, the algebraic equation contains only whole numbers. In order to ensure the solution includes only whole numbers, the rotations that can be executed by the plurality of secondary cogs are limited to a certain extent, which is outlined in FIG. 8. Each of the rotations for each of the secondary cogs is executed as a 360-degree rotation. In some embodiment of the present invention, a partial degree of rotation may be executed with the secondary cogs in order to represent fractional values in a variable such as ¼ or 0.6667. Also in some embodiments of the present invention shown in FIG. 9, a sequential turn limit is applied to each of the secondary cogs in order to indicate the number of rotations by a secondary cog has exceeded the most optimal solution by a significant amount. Consequently, the plurality of rotations with each of the secondary cogs may not exceed the sequential turn limit.

In one embodiment, the present invention is implemented in the form of a physical apparatus. The physical apparatus includes a multitude of gears and a support structure. The primary cog and the secondary cogs are expressed by the gears. The gears are rotatably mounted to the support structure and are positioned according to the aforementioned method. The user may rotate the secondary cogs in order to identify the solution to the algebraic equation.

In another embodiment, the present invention is implemented in the form of a software application on a computing device, which is outlined in FIG. 11 through 21. The computing device includes a graphic user interface (GUI) that allows the user to view and interact with the present invention. Computing devices include, but are not limited to, smart phones, laptops, desktop computers, and tablets. The method for this embodiment is implemented in a virtual setting, allowing a virtual primary cog and a plurality of virtual secondary cogs to be used to represent the constituents of the algebraic equation as well as to simulate the general steps of the present invention, described above. More specifically, the general method is initiated by setting the number of teeth on the virtual primary cog quantitatively greater than the numerical constant. Next, the terms are represented by the virtual secondary cogs, in particular the number of teeth on each of the virtual secondary cogs is quantitatively equal to the coefficient of the corresponding term. The main difference between the two embodiments of implementation for the present invention is that, in this embodiment, each of the virtual secondary cogs are displayed and simulated to enmesh to the virtual primary cog on the GUI. Next, similar to the general method, the origin tooth and the target tooth are visually indicated on the virtual primary cog through the GUI. Additionally, the fixed pointer is visually displayed adjacent to the virtually primary cog with the current tooth is initially positioned at the fixed pointer. Once the algebraic equation is represented through the aforementioned components, the user is then prompted to execute the plurality of rotations with each of the virtual secondary cogs through the GUI in order to align the target tooth at the fixed pointer. Once the target tooth is aligned with the fixed pointer, the rotations with each of the virtual secondary cogs is quantitatively identified as the potential solution for the variable of the corresponding term.

The software application may be used to solve the algebraic equation for more than one numerical constant, the process is the same as the general method. In one embodiment of the software application, the present invention is implemented in a game form. The game form includes solving a plurality of algebraic equations through the use of the virtual gears. Each level of the game represents a different algebraic equation with a corresponding difficulty. The computing device tracks and adjusts a user score for each level wherein the user score is inversely proportional to the collective rotations of the secondary cogs. If the algebraic equation includes more than one numerical constant, than the computing device tracks and adjusts the user score by analyzing the plurality of iterations in order to identify the plurality of collective rotations. In one embodiment, the game also includes an at least one undesirable numerical constant. The undesirable numerical constant is visually indicated on the virtual primary cog as an obstacle tooth and acts as a barrier in the game which the user must avoid. The computing device tracks a number of undesirable instances throughout the game where an undesirable instance occurs when the fixed pointer aligns with the obstacle tooth. The total score of the user is adjusted by the number of undesirable instance. More specifically, the number of undesirable instance is inversely proportional to the user score.

Although the invention has been explained in relation to its preferred embodiment, it is to be understood that many other possible modifications and variations can be made without departing from the spirit and scope of the invention as hereinafter claimed.

What is claimed is:

1. A method for representing and solving an algebraic equation with a physical gear system, said algebraic equation having a coefficient and a variable on one side and a numerical constant on the other side, said method comprising:
   (A) providing a primary cog and at least one secondary cog, each of said primary cog and said at least one secondary cog having a plurality of teeth, said primary cog being enmeshed with said at least one secondary cog, a quantity of said plurality of teeth of said secondary cog corresponding to said coefficient;
   (B) indicating a target tooth amongst said plurality of teeth on said primary cog, wherein said target tooth is quantitatively offset from an origin tooth of said primary cog by said numerical constant, said origin tooth initially coinciding with a pointer; and
   (C) determining a value of said variable by rotating in a circle said at least one secondary cog a number of times to cause said primary cog to rotate such that said target tooth coincides with said pointer;
   wherein, said number quantitatively equals said value.

2. The method of claim 1, wherein an amount of said plurality of teeth of said primary cog is greater than said numerical constant.

3. The method of claim 1, further comprising marking at least one tooth of the plurality of teeth of the primary cog with a readable label.

4. The method of claim 1, further comprising the step of calibrating the primary cog for a second algebraic equation.

5. The method of claim 1, wherein said coefficient includes a plurality of coefficients and said variable includes a plurality of variables.

6. The method of claim 1, further comprising the step of generating a score based on said number of rotations of said secondary cog.

7. The method of claim 6, wherein said score is inversely proportional to said number.

8. A physical gear system for representing and solving an algebraic equation, said algebraic equation having a coefficient and a variable on one side and a numerical constant on the other side, said physical gear system comprising: (A) a primary cog and at least one secondary cog, each of said primary cog and said at least one secondary cog having a plurality of teeth, said primary cog being enmeshed with said at least one secondary cog, a quantity of said plurality of teeth of said secondary cog corresponding to said coefficient; and (B) a pointer corresponding to an origin tooth amongst a plurality of teeth on said primary cog, said origin tooth being quantitatively offset from a target tooth of said primary cog by said numerical constant; and wherein said secondary cog is configured to be rotatable to cause said primary cog to rotate therewith to allow for a determination of said variable based on a number of rotations of said secondary cog used to cause said target tooth to correspond to said pointer.

9. The physical gear system of claim 8, wherein said at least one secondary cog includes a plurality of secondary cogs, each of said secondary cogs having a unique number of teeth and being enmeshed with said primary cog.

10. The physical gear system of claim 8, wherein a diameter of said primary cog is greater than a diameter of said at least one secondary cog.

11. The physical gear system of claim 8, wherein said at least one secondary cog is configured to be rotated 360 degrees.

12. The physical gear system of claim 11, wherein said at least one secondary cog is rotatable in each of a clockwise and a counterclockwise direction.

* * * * *